(12) United States Patent
Coapes et al.

(10) Patent No.: US 9,701,561 B2
(45) Date of Patent: Jul. 11, 2017

(54) HIGH PURITY SYNTHETIC SILICA AND ITEMS SUCH AS SEMICONDUCTOR JIGS MANUFACTURED THEREFROM

(75) Inventors: Richard Benjamin Coapes, Benton (GB); Alan Mundy, Ponteland (GB); Ian George Sayce, Stocksfield (GB)

(73) Assignee: Heraeus Quartz UK Ltd., Tyne & Wear (GB)

( * ) Notice: Subject to any disclaimer, the term of this patent is extended or adjusted under 35 U.S.C. 154(b) by 0 days.

(21) Appl. No.: 13/809,231

(22) PCT Filed: Jul. 8, 2011

(86) PCT No.: PCT/EP2011/061683

§ 371 (c)(1),
(2), (4) Date: Jan. 9, 2013

(87) PCT Pub. No.: WO2012/004398

PCT Pub. Date: Jan. 12, 2012

(65) Prior Publication Data

US 2013/0115391 A1    May 9, 2013

(30) Foreign Application Priority Data

Jul. 9, 2010  (GB) .................................. 1011582.2

(51) Int. Cl.
*C03B 19/14*     (2006.01)
*C03C 3/06*      (2006.01)

(52) U.S. Cl.
CPC ...... *C03B 19/1492* (2013.01); *C03B 19/1438* (2013.01); *C03B 19/1453* (2013.01);
(Continued)

(58) Field of Classification Search
CPC . C03B 19/14; C03B 19/1453; C03B 19/1469; C03B 19/1492; C03B 19/1484
See application file for complete search history.

(56) References Cited

U.S. PATENT DOCUMENTS 3,109,121 A    10/1963   Heeney, Jr.
4,047,966 A    9/1977    Bihuniak et al.
(Continued)

FOREIGN PATENT DOCUMENTS

EP    0163752     12/1985
EP    2070883     6/2009
(Continued)

OTHER PUBLICATIONS

"Fused Quartz Properties & Usage Guide", http://www.quartz.com/gedata.html, Feb. 1996.*
(Continued)

*Primary Examiner* — Queenie Dehghan
(74) *Attorney, Agent, or Firm* — Howson & Howson, LLP (57) ABSTRACT

Hollow ingots of transparent synthetic vitreous silica glass of external diameter greater than 400 mm and internal diameter greater than 300 mm are disclosed. The ingots are substantially free from bubbles or inclusions greater than 100 μm in diameter, have no more than 100 ppB of any individual metallic impurity, and have chlorine concentration less than 5 ppM. Also disclosed are methods for producing such ingots, in which a porous soot body of density greater than 0.4 g/cm$^3$ is deposited on an oxidation resistant mandrel. The soot body is dehydrated on a mandrel comprising graphite, carbon fiber reinforced carbon, silicon carbide, silicon impregnated silicon carbide, silicon carbide-coated graphite or vitreous silica, either under vacuum or in the presence of a reducing gas, and then sintered to transparent pore-free glass under vacuum or in an atmosphere of helium.

15 Claims, 2 Drawing Sheets

(52) U.S. Cl.
CPC ............ *C03B 19/1484* (2013.01); *C03C 3/06* (2013.01); *C03B 2201/03* (2013.01); *C03B 2201/04* (2013.01); *C03B 2201/20* (2013.01); *C03B 2201/24* (2013.01); *C03B 2201/32* (2013.01); *C03B 2201/34* (2013.01); *C03B 2201/36* (2013.01); *C03B 2207/34* (2013.01); *C03B 2207/52* (2013.01); *C03C 2201/11* (2013.01); *C03C 2201/23* (2013.01); *Y02P 40/57* (2015.11); *Y10T 428/131* (2015.01)

(56) References Cited

U.S. PATENT DOCUMENTS

| | | | |
|---|---|---|---|
| 4,191,545 | A | 3/1980 | MacChesney |
| 5,180,410 | A | 1/1993 | Berkey |
| 5,262,365 | A * | 11/1993 | Oyobe et al. ............... 501/54 |
| 6,376,401 | B1 | 4/2002 | Kondo |
| 6,887,576 | B2 | 5/2005 | Sato et al. |
| 7,082,789 | B2 * | 8/2006 | Ezaki .................. C03C 3/06 65/17.4 |
| 7,084,084 | B2 | 8/2006 | Arai et al. |
| 7,275,397 | B2 | 10/2007 | Taft |
| 7,365,037 | B2 | 4/2008 | Sato et al. |
| 7,661,277 | B2 | 2/2010 | Sato et al. |
| 8,230,701 | B2 | 7/2012 | Groh |
| 8,393,179 | B2 | 3/2013 | Schmidt et al. |
| 8,783,069 | B2 | 7/2014 | Schuster |
| 2002/0037797 | A1 * | 3/2002 | Ohga ............... C03B 19/1423 501/54 |
| 2004/0118155 | A1 | 6/2004 | Brown et al. |
| 2005/0187092 | A1 * | 8/2005 | Bookbinder et al. ........... 501/54 |
| 2006/0059948 | A1 * | 3/2006 | Sato et al. .................. 65/32.1 |
| 2008/0053151 | A1 | 3/2008 | Sato |
| 2008/0066497 | A1 | 3/2008 | Weber et al. |
| 2009/0163344 | A1 | 6/2009 | Weber et al. |
| 2011/0072852 | A1 * | 3/2011 | Krause et al. ................ 65/33.1 |
| 2013/0045854 | A1 | 2/2013 | Coapes et al. |
| 2014/0106094 | A1 | 4/2014 | Mundy et al. |

FOREIGN PATENT DOCUMENTS

| | | |
|---|---|---|
| EP | 2088129 A2 | 8/2009 |
| JP | H09-227143 A | 9/1997 |
| WO | 02/08129 A1 | 1/2002 |
| WO | WO 2007/135166 A1 | 11/2007 |

OTHER PUBLICATIONS

Office action dated Jun. 9, 2014 issued in co-pending U.S. Appl. No. 13/581,974.

International Search Report and Written Opinion dated Oct. 31, 2011 issued in International Patent Application No. PCT/EP2011/061683.

Schmet et al, High-temperature oxidation behavior of carbon materials in air, Carbon, 31(1):1-6 (1993).

Printed copy of http://www.schunkgraphite.com/en/sgt/Coating-Service/schunk01.c.39140.en, accessed Mar. 31, 2015.

* cited by examiner

HIGH PURITY SYNTHETIC SILICA AND ITEMS SUCH AS SEMICONDUCTOR JIGS MANUFACTURED THEREFROM

CROSS-REFERENCE TO RELATED APPLICATIONS

This application is a national stage of International Patent Application No. PCT/EP2011/061683, filed Jul. 8, 2011, which claims the benefit of the priority of GB Patent Application No. 1011582.2, filed Jul. 9, 2010 under the Paris Convention. Each of these applications is incorporated herein by reference.

TECHNICAL FIELD

The present invention concerns a high purity synthetic silica glass, and in particular (though not exclusively) the use of semiconductor jigs made from such a glass in the processing of silicon wafers.

BACKGROUND ART

A critical process in the manufacture of single wafers of silicon today is that of plasma or reactive ion etching in which, for example, a layer of silicon dioxide is removed from the surface of the wafer in regions which are not protected by resist. The etch process is undertaken in the presence of fluorine-containing gaseous species, and involves removal of silica as volatile $SiF_4$. During the process the wafer must be held in a tightly controlled location in a jig, which must impart no impurities to the wafer. Such jigs are usually made from quartz glass. Typical sizes for the blanks, from which quartz fabricators machine the final parts, are 420×353 mm, 418×334 mm and 442×365 mm. Such blanks are conveniently cut from large diameter hollow ingots, and for economic reasons the quartz glass is generally made by fusion of natural quartz grain. Potential drawbacks with the use of natural quartz, however, are that it typically contains metallic impurities which can be transferred to the wafer and that the glass may contain certain defects, such as microbubbles and inclusions.

The conditions for removing the oxide layer from the wafer are such that some etching of the quartz glass jig also takes place, so that its dimensions change progressively, and the life of such a jig is limited thereby. Furthermore, such etching can expose any microbubbles and inclusions, and this leads to the release of particles which can be a serious cause of defects in the product. The concentration of such microbubbles and inclusions depends on the method of manufacture of the quartz. Both defects are more numerous in quartz glass derived from electrically fused boule than in flame-fused quartz; indeed it is typical that manufacturers ignore bubbles and inclusions of size less than 80 or 100 μm. High quality semiconductor jigs are therefore generally made from flame-fused quartz, derived from natural quartz crystal. However, even the best quality glass made from natural quartz will contain impurities. Typical metallic impurities are all greater than 100 ppB by weight, and some may be at a level of several hundred ppB, which can lead to the release of particles during the etch process. In this specification, a distinction is made between impurities (e.g. metallic contaminants), which may have a deleterious effect on the properties of the glass or on the process in which it is to be used, and dopants, which may be metallic or non-metallic, and may have a beneficial effect on the product or on the process.

Small bubbles and inclusions are a feature of the quartz glass products which have been accepted in the past for the manufacture of jigs in the semiconductor industry. Bubbles and inclusions are present in relatively large numbers when the glass is made from natural raw materials, and an industry specification for a fused quartz glass may quantify such defects in terms of their overall cross sectional area (CSA) in a given volume of glass, and/or in terms of number (above a certain minimal defect size) which can be counted in a representative volume of the glass.

When very small, such bubbles and inclusions are difficult both to detect and to quantify, and typically, when their size has been less than e.g. 80 μm or 100 μm, they have not been counted in specifications. It may furthermore be difficult to distinguish between a small bubble and a small inclusion, so that the two defect types are frequently combined within a specification and described in some cases as "bubbles", and in others as "inclusions".

A typical electrically fused quartz glass sold for the manufacture of semiconductor jigs has such a specification, which notes the total CSA of all the bubbles in a representative volume of glass, and also the actual number of bubbles in such a representative volume, and also notes the minimum size of bubble included in the count, thus:

| Total CSA of Bubbles in 100 cm³ (mm²) | Max. No. of Bubbles in 100 cm³ |
|---|---|
| 1.5 | 15000 |

Bubbles less than 0.08 mm diameter not counted

On the other hand, a typical flame fused quartz glass sold for similar applications has the following specification:

| Size (mm) | Max. No. of Bubbles/Inclusions in 100 cm³ |
|---|---|
| >0.5 | 0 |
| 0.1-0.5 | ≤50 |

Bubbles/Inclusions less than 0.1 mm diameter not counted

Synthetic silica glasses have in the past been sold generally for optical applications, and have therefore been of higher visual quality. Today, the specification is typically in terms of CSA of all bubbles and inclusions present in a representative volume, e.g. 100 cm³ (as has been described in specification DIN 58927). Thus, the available grades of a typical synthetic silica product may be specified as follows:

| Class | Total Inclusion Cross Section in 100 cm³ (mm²) | Maximum Size (mm) |
|---|---|---|
| 0 | ≤0.03 | 0.10 |
| 1 | ≤0.1 | 0.28 |
| 2 | ≤0.25 | 0.50 |
| 3 | ≤0.5 | 0.76 |
| 4 | ≤1 | 1.00 |
| 5 | ≤2.0 | 1.27 |

The present invention is primarily concerned with high quality components for the semiconductor industry, with bubble and inclusion content of a quality generally comparable with Class 0.

It might appear obvious to seek to replace the natural fused quartz jig with one made from synthetic vitreous silica, which could be of higher purity, and substantially free from microbubbles and inclusions. However, this solution has not been followed generally, partly because of the complexity of manufacture of these large diameter products from available synthetic silica ingots, leading to unacceptable cost, and partly because of the relatively high etch rate of the available synthetic vitreous silica glasses. Thus the largest synthetic vitreous silica ingots have to date been made by the "direct process", i.e. deposition of glass directly from the silica synthesis flame from one or more burners. In this way boules of diameter up to 2 meters may be made, but manufacture of large annular parts from such boules can only be achieved with significant wastage of unused material. The fact that the required rings have rather low ratio, i.e. outside diameter/inside diameter, makes matters worse. For example, the ratio of the blanks mentioned above is 1.19, 1.25 and 1.21 respectively. Manufacture of such low ratio rings from the solid leads to major losses of material, which may be unusable for other applications. Furthermore, the direct process yields glass with typical OH content 600-1, 200 ppM (parts per million), which has the effect of reducing viscosity and increasing the etch rate under typical plasma etch conditions. This is a further reason why these processes are not used in the manufacture of semiconductor jigs for these applications.

Low-OH synthetic silica rings would appear to be better suited to these applications, but such low-OH glasses are achieved by two stage processes. Typically, silica soot is deposited from a synthesis flame to form a porous soot body, which may be subsequently dehydrated (typically by heating in an atmosphere of chlorine) before sintering to pore-free glass either in an atmosphere of helium or under vacuum. The main deposition processes used for manufacture of such glasses are VAD (Vapour-phase Axial Deposition) to make a solid cylindrical soot body, subsequently sintered to form a solid cylinder, and OVD (Outside Vapour Deposition), which involves deposition of silica soot on a mandrel, which is subsequently removed, and the soot body is subsequently sintered to a tubular body. VAD sintered bodies are generally of rather small size for use in semiconductor jigs, and would require extensive and costly reprocessing to achieve the required hollow cylindrical products. Such reshaping of the glass would also introduce severe risk of contamination of the surfaces of the glass body in contact with any graphite tools etc., and that may require subsequent removal of the external surfaces by machining, by etching with acid, or by both techniques. Hitherto, OVD technology has been used for the manufacture of optical fibre materials, and the largest diameter ingots made in this way have been typically of size 200-250 mm diameter, have generally been of heavy ratio, and have been contaminated with chlorine, which is known to increase the etch rate of quartz glass. Even if the purity had been acceptable, reprocessing of such ingots to give the required large diameter low ratio rings would be uneconomic, and would again risk contamination, requiring removal of the surface layers of the product.

As an alternative to the use of synthetic silica for semiconductor jigs, efforts have been made to increase the etch resistance of quartz glass made from natural quartz crystal. Limited success has been achieved by doping the quartz glass with the oxide of one or more metals which have fluorides of volatility less than that of silicon. Thus, doping with aluminium oxide, optionally mixed with the oxide of one or more rare earths, has been proposed as a means to reduce the etch rate of the quartz glass. See, for example, U.S. Pat. No. 6,887,576, U.S. Pat. No. 7,365,037, U.S. Pat. No. 7,661,277 and U.S. Pat. No. 7,084,084.

This approach may lead to an improved etch resistance; however it suffers from the potential disadvantage that, when some etching of the surface of the doped quartz glass does occur, it exposes islands of the dopant oxides. This leads to undesirable roughening of the surface, and ultimately to the release of micro-particles of the dopant oxide, which can cause defects in the wafer.

An alternative technique has therefore been explored, in which efforts have been made to incorporate nitrogen in the glass (see US 2008/0066497), optionally in the presence of additional dopant metals (see US 2008/0053151 and US 2009/0163344). Limited concentrations of nitrogen have been achieved either in the surface of a quartz glass article, or alternatively in the bulk, by heating the product or an intermediate in gaseous ammonia. However, when significant quantities of nitrogen are present, there is a danger of degassing or bubble formation during any further hot working of the glass. It would evidently be preferable if the glass could be manufactured in a near net shape form that did not require further hot working to achieve the dimensions of the final product.

Increase in viscosity of synthetic vitreous silica has also been reported following doping with carbon, or with both carbon and nitrogen in combination. This may be achieved by heating the porous soot body in an atmosphere of, for example, the vapour of a siloxane, a silazane, or other organic species, optionally in the presence of ammonia (see US 2006/0059948).

The effect of doping with carbon or nitrogen as a means to reduce the etch rate in a plasma etch environment is thought to be associated with the increased viscosity induced by incorporation of these species in the lattice. It has furthermore been found that the rate of etching is increased if the glass contains significant amounts of certain non-metallic contaminants, notably OH (hydroxyl), chlorine, and fluorine. These are species known to cause disruption to the network of bonds in the silica structure. It has also been shown that there exists a negative correlation between the viscosity of the glass and the etch rate, and since the viscosity of the glass increases with decrease in fictive temperature, so it might be expected that a reduced etch rate should result from careful annealing of the glass to achieve low fictive temperature.

Thus, the glass required for an etch-resistant semiconductor jig is required to contain a minimal content of OH and a minimal (preferably zero) level of chlorine. Preferably, it is substantially free of fluorine, and it may be optionally doped with a low level of nitrogen, carbon, or possibly a combination.

While low-OH content glass can be achieved by electric fusion of quartz crystal powders under reduced pressure, such products generally contain significant levels of bubbles and inclusions. Where synthetic vitreous silica products are manufactured, these are typically made by vapour deposition from a flame, usually fed with silicon tetrachloride as precursor, to form a porous silica "soot body". Such soot bodies are generally dehydrated by heating in an atmosphere containing chlorine, and subsequently consolidated to pore-free glass by sintering under reduced pressure, or in an atmosphere of helium. The vitrified products retain significant levels of chlorine, which is difficult to remove unless strenuous efforts are made by additional processing.

OBJECT OF THE INVENTION

An object of the present invention is to provide a synthetic vitreous silica component suitable for use in semiconductor manufacture, in a plasma etching or similar environment, which component is distinguished by its ability to demonstrate high etch resistance, which will be associated with a high viscosity, by exceptionally high chemical purity, by the substantial absence of microbubbles and inclusions and other causes of particle or dust release, preferably while avoiding the drawbacks of existing methods of doping with metallic or non-metallic dopants. The required properties require that the glass contain a minimal concentration of hydroxyl groups, and a minimal, preferably zero, concentration of chlorine and fluorine.

It is a further object that such components be produced efficiently and with high material yield at an economically acceptable cost and by a simple process with a minimal number of stages. The components which are a particularly preferred object of the invention are all annular, i.e. ring-shaped, and are made by slicing a large diameter hollow ingot into annular sections. While this has not been possible in the past, efficient manufacture necessitates that the hollow ingot should be generated with appropriate internal and external diameters, i.e. the hollow ingot is formed as a hollow soot body, which after sintering is of "near net shape", permitting the removal of a minimal amount of glass to achieve the ultimate dimensions of the required annular component. The components of the present invention are of internal diameter at least 300 mm and external diameter at least 400 mm. Manufacture of the intermediate blank being of near net shape means that the yield of useful glass is a maximum, and there is very little wastage of the deposited glass on converting the ingot to saleable hollow blank, or final annular semiconductor jig of the required dimensions. There is a further advantage in that, following manufacture of the glass, there is no requirement for a further high temperature reflow process in order to achieve a product of the required dimensions.

SUMMARY OF THE INVENTION

It has been found that these objects can be achieved by a process in which a porous silica soot body is deposited at a suitable density on an oxidation resistant mandrel, which is then removed and replaced by a secondary mandrel of graphite or an alternative material, on which the soot body is dehydrated, either under vacuum or in the presence of a reducing gas, and the body subsequently sintered again under vacuum, or optionally in the presence of an inert gas such as helium. In the present context vacuum generally implies a gas pressure of less than 100 Pa (0.75 torr), though actual gas pressure within the furnace may fluctuate, depending on the rate of heating and degassing of the body. By this means, it is possible to achieve a hollow ingot of transparent synthetic vitreous silica glass of the requisite dimensions, wherein the ingot: is substantially free from bubbles or inclusions greater than 100 µm in diameter, and preferably substantially free from bubbles or inclusions greater than 10 µm in diameter; has no more than 100 ppB (parts per billion) of any individual metallic impurity, and preferably no more than 10 ppB of any individual metallic impurity; and has chlorine concentration below 5 ppM (parts per million). In this specification, concentrations expressed as parts per billion (ppB) or parts per million (ppM) are to be understood as indicating ppB or ppM by weight respectively.

One principal use for ingots of the invention is in the manufacture of semiconductor jigs. In this context, what we mean by the phrase "substantially free from bubbles or inclusions . . . " is that the ingot should have a sufficiently small number of such features that one or more (and preferably many) semiconductor jigs may be machined from the ingot, such that each of the semiconductor jigs so formed has no such bubbles or inclusions greater than 100 µm in diameter, and preferably no such bubbles or inclusions greater than 10 µm in diameter. Thus, the ingot itself may, in the best case, be entirely devoid of bubbles or inclusions greater than 100 µm in diameter, or even entirely devoid of bubbles or inclusions greater than 10 µm in diameter; alternatively, a small number of such features may be tolerable in the ingot, provided that they are so sparse that individual jigs devoid of such features can be machined therefrom without undue wastage of material.

While graphite is a preferred material for the secondary mandrel, in certain embodiments this mandrel may be made from an alternative material, including carbon fibre reinforced carbon (CFRC), silicon carbide, and silicon impregnated silicon carbide. In some embodiments the oxidation resistant mandrel used for soot deposition can serve also as the mandrel for sintering, in which case there is no need to transfer the soot body to a secondary mandrel after deposition, and before dehydration and sintering. The use of a thin-walled tube of vitreous silica (quartz glass) as a substrate for soot deposition, which tube may be optionally supported on a refractory carrier made from e.g. graphite, silicon carbide etc., is a special case, whereby the silica soot body may be dehydrated and sintered while attached to the silica substrate tube, which becomes incorporated in the glass of the hollow ingot product and may remain a part thereof, or may be subsequently removed by a machining or etching process.

The present invention accordingly provides, in one aspect, a hollow ingot of transparent synthetic vitreous silica glass of external diameter greater than 400 mm and internal diameter greater than 300 mm, wherein said ingot: is substantially free from bubbles or inclusions greater than 100 µm in diameter; has no more than 100 ppB of any individual metallic impurity; and has chlorine concentration below 5 ppM.

The invention provides, in a further aspect, a hollow ingot of transparent synthetic vitreous silica glass of external diameter greater than 400 mm and internal diameter greater than 300 mm, or a semiconductor jig made therefrom, wherein said ingot or semiconductor jig: is substantially free from bubbles or inclusions greater than 10 µm in diameter; has no more than 10 ppB of any individual metallic impurity; and has chlorine concentration below 5 ppM.

In many cases, though not exclusively, the ratio of external to internal diameter is less than 1.33. Thus, the invention is particularly suitable for producing large annular items, such as rings for semiconductor jigs, where the ability to produce an item in synthetic silica glass of shape and dimensions as near as possible to those of the final desired product is particularly advantageous. In particular, the invention allows such products to be manufactured with the minimum of wastage of synthetic silica material due to necessary machining to final shape, and without the need for a secondary reflow process.

In another aspect, the invention provides a process for the manufacture of a hollow ingot of the type described, the process comprising the steps: depositing a porous soot body of density greater than 0.4 g/cm$^3$ on an oxidation resistant mandrel; dehydrating said soot body on a mandrel comprising graphite, carbon fibre reinforced carbon, silicon carbide, silicon impregnated silicon carbide, silicon carbide-coated graphite or vitreous silica, either under vacuum or in the presence of a reducing gas; and sintering the dehydrated soot body to transparent pore-free glass, under vacuum or in an atmosphere of helium, while supported on the latter mandrel.

In an alternative aspect, the invention provides a process for the manufacture of a hollow ingot of transparent synthetic vitreous silica glass of external diameter greater than 400 mm and internal diameter greater than 300 mm, the process comprising the steps: feeding a silica precursor to the flame of one or more synthesis burners; depositing a porous soot body of density greater than 0.4 g/cm$^3$ on an oxidation resistant mandrel of diameter at least 300 mm; dehydrating said soot body on a mandrel comprising graphite, carbon fibre reinforced carbon, silicon carbide, silicon impregnated silicon carbide, silicon carbide-coated graphite or vitreous silica, either under vacuum or in the presence of a reducing gas; and sintering the dehydrated soot body to transparent pore-free glass under vacuum or in an atmosphere of helium.

In some cases, it will be convenient to remove the oxidation resistant mandrel after the deposition step and to replace it with a different mandrel, on which the dehydration step takes place. Alternatively, the oxidation resistant mandrel and the mandrel used during the dehydration and sintering steps may be the same, in which case the oxidation resistant mandrel is not removed after soot deposition, but is retained and used to support the soot body during the subsequent dehydration and sintering processes.

Typically, ingots manufactured according to the invention will have OH content less than 50 ppM, sometimes even as low as 20 ppM or below. The ingots are also typically substantially free of fluorine, chlorine or other halogen impurities; for instance, they have a chlorine content below 5 ppM and more preferably below 1 ppM. In embodiments of particular interest, the annealing point (viscosity $10^{13}$ Poise) is greater than 1,200° C., and furthermore the fictive temperature may be less than 1,100° C.

Ingots according to the invention may be doped. For example, doping may be carried out with aluminium and/or with one or more rare earth metals. Doping may be achieved, for example, using suitable salts (e.g. oxides) of the desired metals. The method may involve, in some embodiments, the feeding of an aqueous solution of dopant salt(s) to the flame of a suitable synthesis burner as a spray of liquid droplets comprising an emulsion of microdroplets of the aqueous phase dispersed in droplets of the silica precursor. In other embodiments, the porous soot body may be immersed in a solution of one or more salts of aluminium and/or one or more rare earth metals, and subsequently dried, calcined and sintered to pore-free glass. Alternatively, the glass may be doped with carbon or nitrogen or both.

Any suitable (preferably chlorine-free) silica precursor material may be used. Particularly appropriate precursors for use in the present invention are the siloxanes. Conveniently, hexamethyldisiloxane (HMDS), octamethylcyclotetrasiloxane (OMCTS), decamethylcyclopentasiloxane (DMCPS) or a mixture of any two or more thereof may be used. Such precursors may be delivered to the synthesis flame of the burner (or burners) in the form of vapour, optionally in the presence of a carrier gas, or alternatively in the form of a spray of atomised liquid droplets whereby the droplets are generated via conventional methods, such as gas atomisation, ultrasonic atomisation, etc.

Prior to sintering, the soot body may be subjected to heat treatment in a reactive, e.g. reducing atmosphere, for instance an atmosphere comprising hydrogen, carbon monoxide, ammonia, nitrogen, a hydrocarbon gas or an organic or organosilicon vapour (e.g. a vapour comprising a siloxane or a silazane), or a mixture of one or more of such gases, typically at sub-atmospheric pressure and optionally diluted with inert gas. The sintering step may, for example, be carried out under vacuum or in an atmosphere containing helium.

In methods according to the invention, high purity silica soot may, for example, be deposited by outside vapour deposition on a suitable oxidation-resistant mandrel of diameter at least 300 mm, selected to correspond with the inside diameter of the required annular product, to form a porous silica soot body of predetermined outside diameter such that, on sintering to pore-free glass, the product has inner and outer dimensions approximating to those of the required hollow ingot, or annular products thereof.

The soot body may then be transferred to a high purity graphite mandrel of diameter slightly less than that of the required product, and the assembly may then be subjected to vacuum heat treatment, typically at temperatures in the range 1150-1350° C., to permit dehydration, followed by sintering to pore-free glass, typically at a temperature in the range 1450-1600° C. As noted above, alternative mandrel materials are possible, including carbon fibre reinforced carbon (CFRC), silicon carbide, silicon impregnated silicon carbide, and even vitreous silica.

The dimensions of the soot body having been chosen appropriately, the final inside and outside diameters of the hollow ingot so produced are such that minimal machining of these surfaces is required to achieve the diameters of the required final product. This heat treatment may be followed by a controlled annealing operation, to bring the glass to the required low fictive temperature. Such annealing may be undertaken either in the vacuum sintering furnace, or alternatively in a separate annealing oven designed for this purpose. In one embodiment the near net shape of the hollow ingot is achieved immediately after sintering of the soot body, by lowering the vitrified body into a heated mould, for example made from high purity graphite, as described in EP 2,024,289.

After annealing, the sintered ingot may be machined to the required inner and outer diameters, and sliced to appropriate lengths for sale or further processing. Subsequent processing may involve further fine machining to provide the final ring-shaped products to be used in processing the semiconductor wafer. The finishing of the rings may be by grinding, lapping, flame polishing etc., and may include steps to provide an appropriate surface roughness, including sand-blasting, acid etching, or acid-based "frosting", for example in solutions of ammonium fluoride in hydrofluoric acid to provide a pseudo-crystalline surface finish of well-defined microstructure.

The manufacture of a hollow soot body of the required dimensions leading to a hollow ingot of synthetic vitreous silica of near net shape, i.e. internal diameter greater than 300 mm and external diameter greater than 400 mm (ratio≤1.33), has not been demonstrated in the past, and requires a novel approach. It is essential that the soot deposit be of sufficient density to provide adequate strength for the required handling operations, and this generally necessitates the deposition of a porous soot of density at least 0.4 g/cm$^3$, or more typically in the region of 0.6 g/cm$^3$. The size of the soot body also makes significant demands on the energy requirement of the process, and this energy input must be provided either in the form of fuel gas, typically hydrogen, natural gas (methane), propane etc., or in the silica precursor. In this regard the present inventors have found that a considerable advantage can be provided by using as precursor a siloxane compound, preferably a cyclic polymethylsiloxane, such as octamethylcyclotetrasiloxane (OMCTS, also known as D4) or decamethylcyclopentasiloxane (DMCPS, or D5), or a mixture of such products, in place of the more conventional silicon tetrachloride, or the chlorine-free alkoxysilanes (e.g. methyltrimethoxysilane, MTMS) which have been used in the past.

In seeking an environmentally acceptable and economical process for a chlorine-free glass, silicon tetrachloride has been found to be unacceptable as a precursor. Not only does the reaction with oxygen lead to noxious by-products such as chlorine and hydrochloric acid gases (see reactions shown below), but the heat of combustion is so low that it is necessary to provide much additional fuel gas and oxygen to promote the reaction, and to ensure that a high density soot deposit can be achieved. Two reactions, oxidation and hydrolysis are occurring in parallel, with oxidation predominating if the temperature is sufficiently high (see J. R. Bautista and R. M. Adams, *J. Aerosol Sci.*, 22(5) 667-675, (1991)):

$$SiCl_4(g)+O_2 \rightarrow SiO_2(s)+2Cl_2 \Delta H_r=-240 \text{ kJ/mol}$$

$$SiCl_4(g)+2H_2+O_2 \rightarrow SiO_2(s)+4HCl \Delta H_r=-609 \text{ kJ/mol}$$

The presence of much fuel gas, and the equivalent flow of oxygen, required to complete these reactions and achieve the required soot body density, greatly increases turbulence in the flame and reduces the concentration of silica vapour species, giving rise to small-sized silica nano-particles and reduced collection efficiency. Also, after sintering, the product glass will contain traces of chlorine, unless further process steps are included to eliminate the residual halogen.

Alternatively these halogen-containing effluent gases may be avoided by using a chlorine-free silica precursor, and for various reasons siloxanes, particularly polymethylcyclosiloxanes, are preferred precursors. Thus, for example, OMCTS may be reacted with oxygen to form silica nano-particles in a flame, and these grow, by continuing condensation and agglomeration, and may be collected as a porous soot body. The reaction is accompanied by a considerable release of energy, as shown in the equation below:

$$[(CH_3)_2SiO]_4(g)+16O_2(g) \rightarrow 4SiO_2(s)+8CO_2(g)+12H_2O(g) \Delta H_R=-7{,}669 \text{ kJ/mol}$$

This energy is available in the centre of the flame, where it facilitates both particle growth and thermophoretic deposition of the particles on the substrate. The high energy flame also promotes partial sintering of the porous body and the achievement of high soot density, without the need for an increased flow of auxiliary combustion gas (e.g. hydrogen, methane, etc.), which would increase turbulence and decrease the concentration of particles in the flame, and thus reduce the deposition efficiency, as well as adding to the cost of the process.

It is also of interest to note the high yield of silica from a cyclic polymethylsiloxane such as OMCTS. On oxidation, 1 kg of OMCTS yields 0.81 kg of silica, and a relatively small volume of carbon dioxide and water vapour. On the other hand, 1 kg of silicon tetrachloride yields only 0.35 kg of silica, together with a large volume of acidic effluent gases which dilute the flame and further reduce the potential collection efficiency.

A typical size of blank required by semiconductor quartz fabricators for the manufacture of a standard annular semiconductor jig has external diameter 420 mm and internal diameter 353 mm. This is supplied by the quartz manufacturer as a cylinder, or as annular slices, for final machining by the quartz fabricator to the exact dimensions required by the user. Hitherto these cylinders have been supplied in fused natural quartz, either by drilling from a solid ingot (with consequent wastage of unused material), by drawing as a hollow oversize body from a continuous fusion furnace, by batch fusion in a rotating furnace, or by a laborious reflow process from a smaller solid or hollow body of fused quartz. Each of the processes suffers from deficiencies, yielding a costly product, which retains the microbubbles and inclusions inherent in the natural quartz crystal source. Attempts to manufacture such products from synthetic silica powders have led to a very costly product, which is difficult to achieve totally free from bubbles and inclusions, while methods based on vapour deposition have so far led only to small ingots, the conversion of which to large diameter hollow bodies has proved to be unacceptably costly. Furthermore, these products have generally been contaminated by traces of chlorine, or hydroxyl, both of which lead to reduction of the viscosity of the glass, and to an enhanced etching rate in a plasma etch environment. Also, as previously noted, reflow to achieve larger diameter hollow products has used graphite moulds, and diffusion of impurities from these has led to contamination, and the need for subsequent removal of the outer layers of the product by machining, by acid etching or by a combination of these techniques.

The present invention overcomes the deficiencies of past processes and products, and provides an economically viable route to a high purity defect-free product of excellent plasma-etch resistance.

The invention is hereinafter described in more detail by way of example only, with reference to the accompanying figures, in which.

EXAMPLE

An example of the new process will now be described, as it may be applied to an ingot of dimensions suitable for manufacture of a standard blank for the manufacture of a semiconductor jig, i.e. a hollow ingot of outside diameter 420 mm, and inside diameter 353 mm.

Figure 1:
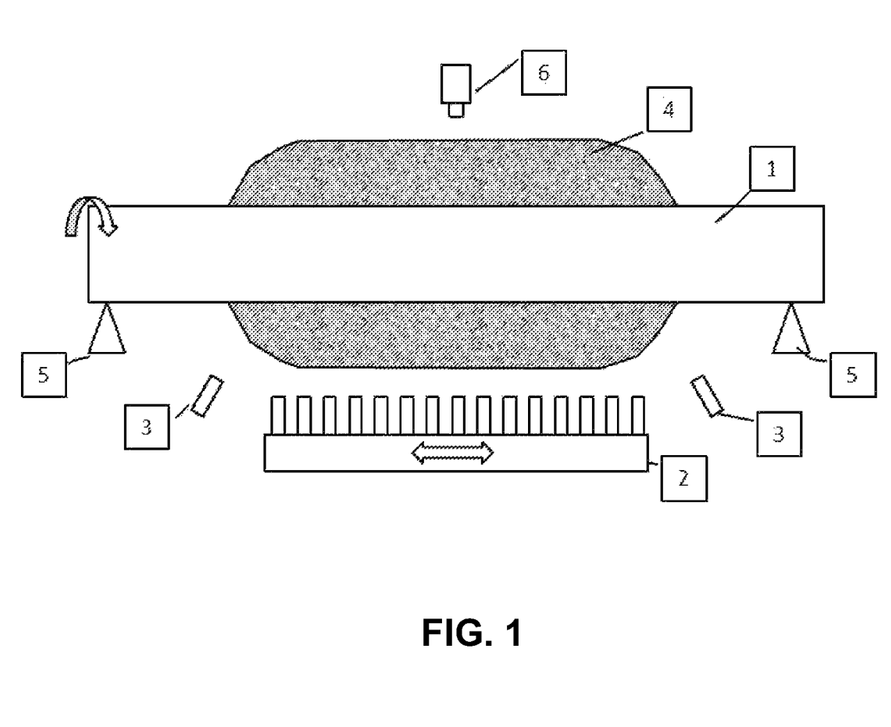
FIG. 1 is a schematic diagram of a deposition facility suitable for use in a method according to the invention.

A suitable deposition facility is shown schematically in FIG. 1. This shows a horizontal deposition lathe, which is used to support a cylindrical substrate (1) made of an oxidation-resistant refractory material, such as alumina, silicon carbide etc., of diameter 350 mm. The lathe is provided with a linear array of 15 coaxial burners (2) made from quartz glass, each separated from its neighbours by a distance of 100 mm. These burners are fed with OMCTS vapour, in nitrogen as carrier gas, surrounded by a flow of hydrogen, which is again surrounded by a flow of oxygen. The flames of these burners are directed at the rotating substrate, and are caused to oscillate in an axial direction with amplitude of 200 mm. Alternatively, it is possible to arrange that the rotating substrate is oscillated in a similar manner. As the soot body accumulates, end-burners (3), also fed with hydrogen and oxygen, are directed at the tapered ends of the soot body, causing densification of the soot in the end regions, and minimising the risk of crack propagation from the ends of the body. Also, as the soot body grows in size, the distance between the burner array and soot body (4)

is maintained at a constant value, in the region of 150 mm, either by raising the mandrel, or by lowering the burner assembly.

Analysis of the soot from a similar experiment has shown that the deposition conditions chosen yield an average density of 0.6 g/cm$^3$, so deposition of silica soot is maintained for a period of 21 hours, during which the soot is deposited to a diameter of 566 mm.

The achievement of near net shape being an object of the process, the duration of the deposition process is adjusted to ensure deposition of the appropriate quantity of silica soot. This is aided by the provision of on-line weight measurement using load cells (5), so that as well as monitoring the diameter of the body using video camera (6), or a suitable laser gauge, it is possible to monitor the weight, and thus also the density of the deposited silica soot.

On completion of the deposition process, the soot body is allowed to cool, and the mandrel is removed and replaced with a high purity graphite mandrel (<10 ppM ash), of diameter 347 mm, chosen to yield the required internal diameter of hollow ingot after sintering. The assembly is mounted in a vacuum furnace, resistively heated with graphite heating elements. The furnace is evacuated to a pressure of less than 0.5 torr (67 Pa), and back-filled with nitrogen. The pressure is again reduced to less than 0.5 torr (67 Pa) and the temperature is raised to 1,100° C., and dehydration of the soot body is commenced. After 6 hours at 1,100° C., the temperature is raised to 1,200° C., and held for a further period of 12 hours. The temperature is then raised progressively to 1,500° C. to effect sintering to a pore-free glass, and then the furnace is allowed to cool.

Under the conditions used, the axial shrinkage of the soot body on sintering is approximately 10%, and the final external and internal diameters of the glass cylinder so generated are approximately 425 mm and 348 mm respectively, permitting machining of the required blank (420×353 mm), with only small loss of material. By refining the operating parameters, it is anticipated that an even better match of dimensions can be achieved.

It is thus clear that by appropriate choice of the diameter of the mandrel used for sintering and of the duration of the deposition process it is possible to ensure that the hollow ingot product after sintering will have appropriate inside and outside diameters such as will yield the desired product dimensions with minimal machining losses, and a hollow ingot product of near net shape is thus achieved via the combination of processes described.

It appears beneficial in terms of increased viscosity of the glass, and etch-resistance, to achieve a low fictive temperature, and this may be attained by controlled slow cooling over a temperature range 1,200° C. down to 950° C. This may be effected in the above vacuum furnace (with corresponding loss of vacuum sintering capacity), or alternatively in a separate annealing oven. The ultimate fictive temperature achieved is dependent on cooling rate and duration of the annealing operation. The fictive temperature of a sample of the glass may be measured via the intensity of laser Raman scattering at a wavelength of 606 cm$^{-1}$ as described by C. Pfleiderer, et al. (*J. Non-Cryst. Solids*, 159 (1993), 145-153). It has proved beneficial to achieve a fictive temperature of less than 1,100° C., preferably less than 1,075° C., but for this high viscosity glass this requires an annealing cycle lasting several days.

After annealing, the graphite mandrel is removed, and samples are taken for chemical analysis, OH and fictive temperature measurement. Typically analysis of potential contaminant metals reveals none at a concentration greater than 10 ppB (limit of detection), and as expected the material is substantially chlorine-free. Analysis of chlorine by nuclear activation has indicated Cl<380 ppB (limit of detection). Likewise, the glass is expected to be substantially free from fluorine.

The viscosity of samples 60×4×3 mm in size may be measured by the bending beam method as described in ASTM C 598 93, and the Annealing Point (viscosity 10$^{13}$ Poise) is typically found to be ≥1,200° C. The OH-content is determined by measuring the IR absorption according to the method of D. M. Dodd et al. ("Optical determinations of OH in fused silica", *J. Appl. Physics* (1966), p. 3911), and is typically in the range 10-20 ppM. The fictive temperature can be reduced to 1,050-1,100° C. by using an appropriate annealing schedule.

Figure 2:
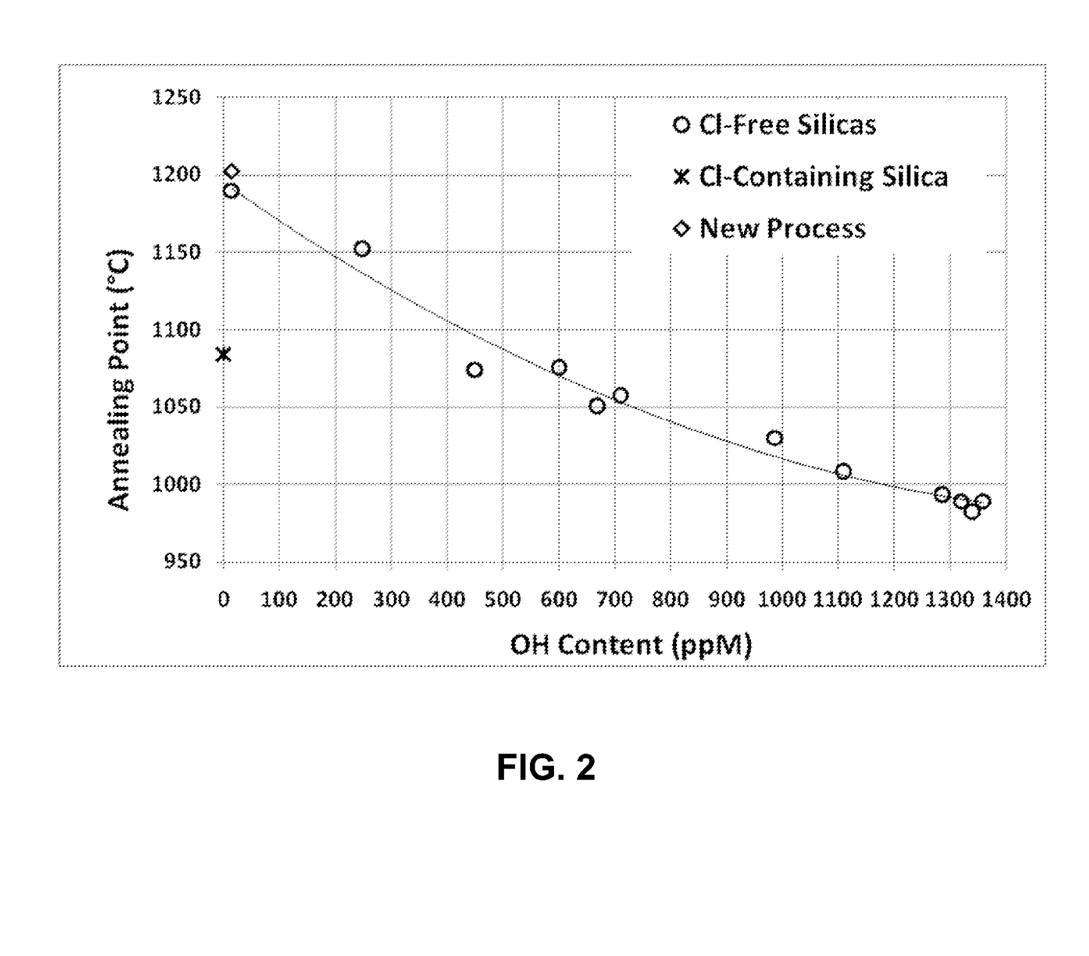
FIG. 2 is a plot of annealing point (viscosity $10^{13}$ Poise) versus the hydroxyl (OH) concentration for a series of chlorine-free and chlorine-containing synthetic vitreous silica samples.

The viscosity of products made in this way is surprisingly high; however, on studying the viscosity of a range of other glasses, it was found to fit a trend. FIG. 2 shows a plot of a range of chlorine-free synthetic silica glasses, made from OMCTS (by direct deposition, and by soot and sinter methods) with controlled OH concentration. As may be seen, the Annealing Point (viscosity 10$^{13}$ Poise) rises with diminishing OH concentration, and for the current sample was found to be 1,202° C.

Also shown on this plot is the viscosity of a single specimen of synthetic vitreous silica sintered from a soot body which had been dehydrated in an atmosphere containing chlorine prior to sintering under vacuum, so that the OH content was 1 ppM and residual chlorine was approximately 2,000 ppM. This glass exhibited an annealing point of only 1,084° C., dramatically lower than the figures achieved in the present investigation.

Intense examination of a polished annular section of the above ingot of thickness 100 mm typically reveals no bubbles or inclusions of size greater than the detection limit of the apparatus (10 μm) in a volume of 100 cm$^3$.

This example demonstrates the principle of the new process, which provides a novel and economically viable route for the manufacture of blanks for making annular semiconductor jigs of extreme chemical purity, typically having all metallic impurities less than 100 ppB, substantially free from bubbles and inclusions greater than 100 μm, and of high viscosity and excellent etch resistance.

It is thought that the high viscosity of the glass made in the present work may arise in part from the fact that the soot body is dehydrated and subsequently sintered in intimate contact with a large diameter graphite mandrel, and within a vacuum furnace with graphite heating elements and carbon-based insulation materials. The heat treatment processes described above thus occur in a strongly reducing environment. It is furthermore to be expected that high viscosity glass with good plasma-etch resistance will also be achieved if, prior to sintering, the heat treatment includes heating in a reducing atmosphere, for example in the presence gases such as hydrogen, carbon monoxide, ammonia, a hydrocarbon gas or an appropriate organic or organosilicon vapour, such as the vapour of a siloxane or a silazane.

It should be noted that with the current process higher levels of doping by nitrogen, by carbon, or by both can be achieved than with prior art processes because, following sintering, no further hot working of the material is necessary in the manufacture of the final product.

The above example employed OMCTS as precursor introduced to the synthesis flame in the form of vapour. Alternatively, other siloxanes may be used alone or as mixtures of vapours. Again alternatively, it is possible to use other chlorine-free silicon-containing precursors, for example alkoxysilanes, either pure or as mixtures. In further embodiments, any of these precursors may be fed to the synthesis flame as a spray of atomised liquid droplets using burners adapted for atomisation via conventional methods, including gas atomisation, and ultrasonic atomisation, etc.

In further variations of the above process, it is possible to manufacture a large diameter hollow body of synthetic vitreous silica of near net shape doped with one or more rare-earth metals, optionally in the presence of aluminium as a co-dopant. This may be achieved using a chlorine-free silica precursor of silica, preferably a siloxane compound fed as vapour to the flame, and by feeding the dopant metals likewise in the form of vapours of appropriate compounds. However, it may also be achieved by feeding the silica precursor, preferably a siloxane, in the form of a spray of atomised liquid, with the dopant metal or metals being fed as an aqueous solution of the appropriate salts in the form of an emulsion of microdroplets of the aqueous phase dispersed in the silica precursor, as envisaged in GB 1003468.4 and PCT/EP2011/052923. An alternative doping method involves immersion of the porous soot body in a solution of one or more salts of aluminium and/or one or more rare earth metals, before drying, calcining and sintering to pore-free glass.

The invention claimed is:

1. A process for the manufacture of an annular semiconductor jig of transparent synthetic vitreous silica suitable for use in a plasma etching environment, said jig having an external diameter greater than 400 mm and an internal diameter greater than 300 mm, wherein said jig is substantially free from bubbles or inclusions greater than 100 µm in diameter; has no more than 100 ppB of any individual metallic impurity; and has chlorine concentration less than 380 ppB, the process comprising the steps of:
  depositing a porous soot body of density greater than 0.4 g/cm$^3$ on an oxidation resistant mandrel of external diameter greater than 300 mm, said silica soot being generated during said depositing step by combustion of vapor of at least one of octamethylcyclotetrasiloxane, hexamethyldisiloxane, or decamethylcyclopentasiloxane;
  dehydrating said soot body on a mandrel comprising a material selected from graphite, carbon fibre reinforced carbon, silicon carbide, silicon impregnated silicon carbide, silicon carbide-coated graphite and vitreous silica, under vacuum;
  sintering the dehydrated soot body to transparent pore-free glass under vacuum to produce a hollow ingot; and
  slicing the hollow ingot to produce the annular jig,
  wherein, the hollow ingot is manufactured as a result of said depositing, dehydrating and sintering steps to a near-net-shape relative to a final shape of the annular jig without a secondary reflow or resizing process step,
  wherein the transparent vitreous silica of the annular jig has an annealing point (viscosity 10$^{13}$ Poise) greater than 1,200° C.; and
  wherein the annular transparent synthetic vitreous silica jig is not doped with nitrogen and is not doped with fluorine.

2. A process for the manufacture of an annular transparent synthetic vitreous silica jig of external diameter greater than 400 mm and internal diameter greater than 300 mm and having a chlorine concentration of less than 5 ppM, the process comprising the steps of:
  feeding a chlorine-free silica precursor to the flame of at least one synthesis burner;
  depositing a porous soot body of density greater than 0.4 g/cm$^3$ on an oxidation resistant mandrel of diameter at least 300 mm;
  dehydrating said soot body on a mandrel comprising a material selected from graphite, carbon fibre reinforced carbon, silicon carbide, silicon impregnated silicon carbide, silicon carbide-coated graphite and vitreous silica, under vacuum;
  sintering the dehydrated soot body to transparent pore-free glass under vacuum to produce a hollow ingot; and
  slicing the hollow ingot to produce the annular transparent synthetic vitreous silica jig,
  wherein, the hollow ingot is manufactured to a near-net-shape relative to a final shape of the annular transparent synthetic vitreous silica jig as a result of said depositing, dehydrating and sintering steps and without a secondary reflow or resizing process step,
  wherein the transparent vitreous silica of the annular jig has an annealing point (viscosity 10$^{13}$ Poise) greater than 1,200° C.; and
  wherein the annular transparent synthetic vitreous silica jig is not doped with nitrogen and is not doped with fluorine.

3. A process according to claim 2, wherein the oxidation resistant mandrel and the mandrel used during the dehydration step are separate, the process further comprising the steps, subsequent to deposition and prior to dehydration, of removing said oxidation resistant mandrel and replacing the same with said mandrel upon which the dehydration and sintering steps takes place.

4. A process according to claim 2, wherein said oxidation resistant mandrel and said mandrel used during the dehydration step are the same, and wherein said oxidation resistant mandrel is not removed after soot deposition, but is retained and used to support the soot body during the subsequent dehydration and sintering processes.

5. A process according to claim 2, further comprising the step of annealing said hollow ingot to achieve a fictive temperature less than 1,100° C.

6. A process according to claim 2, further comprising the step of machining said hollow ingot into the annular jig, with minimal wastage of synthetic vitreous silica material.

7. A process according to claim 2, wherein the diameter of the mandrel used for sintering and the duration of the deposition process are both selected such that the hollow ingot product after sintering has an external diameter greater than 400 mm and internal diameter greater than 300 mm, and a ratio of external to internal diameter of not greater than 1.33.

8. A process according to claim 2, wherein said chlorine-free silica precursor material is delivered to said synthesis flame in the form of vapor.

9. A process according to claim 8, wherein said chlorine-free silica precursor material comprises at least one siloxane.

10. A process according to claim 9, wherein said at least one siloxane includes octamethylcyclotetrasiloxane, hexamethyldisiloxane, or decamethylcyclopentasiloxane.

11. A process according to claim 8, wherein said chlorine-free silica precursor material comprises at least one cyclic polymethylsiloxane.

12. A process according to claim 2, wherein the chlorine concentration of the annular transparent synthetic vitreous silica jig is less than 380 ppB.

13. A process according to claim 2, wherein the annular transparent synthetic vitreous silica jig is not doped with aluminum.

14. A process for the manufacture of an annular transparent synthetic vitreous silica jig of external diameter greater than 400 mm and internal diameter greater than 300 mm and having a chlorine concentration of less than 5 ppM, the process consisting of the steps of:
- feeding a chlorine-free silica precursor to the flame of at least one synthesis burner;
- depositing a porous soot body of density greater than 0.4 g/cm$^3$ on an oxidation resistant mandrel of diameter at least 300 mm;
- dehydrating said soot body on a mandrel comprising a material selected from graphite, carbon fibre reinforced carbon, silicon carbide, silicon impregnated silicon carbide, silicon carbide-coated graphite and vitreous silica, under vacuum;
- sintering the dehydrated soot body to transparent pore-free glass under vacuum to produce a hollow ingot; and
- slicing the hollow ingot to produce the annular transparent synthetic vitreous silica jig,
- wherein, the hollow ingot is manufactured to a near-net-shape relative to a final shape of the annular transparent synthetic vitreous silica jig as a result of said depositing, dehydrating and sintering steps and without a secondary reflow or resizing process step,
- wherein the transparent vitreous silica of the annular jig has an annealing point (viscosity $10^{13}$ Poise) greater than 1,200° C.,
- wherein the annular transparent synthetic vitreous silica iig is not doped with nitrogen and is substantially free of fluorine.

15. A process according to claim 14, wherein said chlorine-free silica precursor comprises at least one siloxane.

* * * * *